United States Patent [19]

Matthias

[11] Patent Number: 4,471,991
[45] Date of Patent: Sep. 18, 1984

[54] ARTICULATED DEFLECTOR SHIELD ASSEMBLY AND INTERCHANGEABLE FRAME MOUNTING SYSTEM THEREFOR

[75] Inventor: Gregory H. Matthias, Longmont, Colo.

[73] Assignee: Autotron Products, Inc., Longmont, Colo.

[21] Appl. No.: 451,022

[22] Filed: Dec. 20, 1982

[51] Int. Cl.³ ............................................... B60J 1/20
[52] U.S. Cl. .................................. 296/91; 180/68.6; 248/201; 248/300
[58] Field of Search ........................ 296/91; 180/68 P; 160/DIG. 1, DIG. 2; 248/201, 300, 251, 223.4, 224.2

[56] References Cited

U.S. PATENT DOCUMENTS

| | | | |
|---|---|---|---|
| 1,889,440 | 11/1932 | Groehn | 180/68 P |
| 1,959,953 | 5/1934 | Green | 293/54 |
| 3,015,517 | 1/1962 | Thornburgh | 296/91 |
| 3,815,700 | 6/1974 | Mittendorf | 296/91 |
| 3,863,728 | 2/1975 | Mittendorf | 180/68 |
| 4,052,099 | 10/1977 | Lowery et al. | 296/91 |
| 4,085,964 | 4/1978 | Hutto et al. | 296/91 |
| 4,109,744 | 8/1978 | Ping | 180/68 |
| 4,153,129 | 5/1979 | Redmond | 180/68 |
| 4,178,034 | 12/1979 | Mittendorf | 296/91 |
| 4,236,592 | 12/1980 | Ziegler | 180/68 |

Primary Examiner—Robert R. Song
Attorney, Agent, or Firm—John E. Reilly

[57] ABSTRACT

An interchangeable frame mounting system is incorporated into an articulated deflector shield assembly for releasable, rigid connection to the hood or radiator grille of a vehicle. The assembly includes a pair of complementary halves each having an elongated C-shaped channel or flange and a rearwardly directed open slot along the length with mating edge portions at adjacent ends of the halves adapted to abut one another. A splice is releasably inserted in the open slots for interconnecting the halves of the frame together. A plurality of brackets at uniformly spaced intervals along each channel includes a leg portion alignable with the slot of the flange and a second leg extends at an angle to the first leg and conforms to the angle of the return portion together with first and second fasteners for releasably interconnecting the first and second legs to the flange and hood, respectively.

16 Claims, 12 Drawing Figures

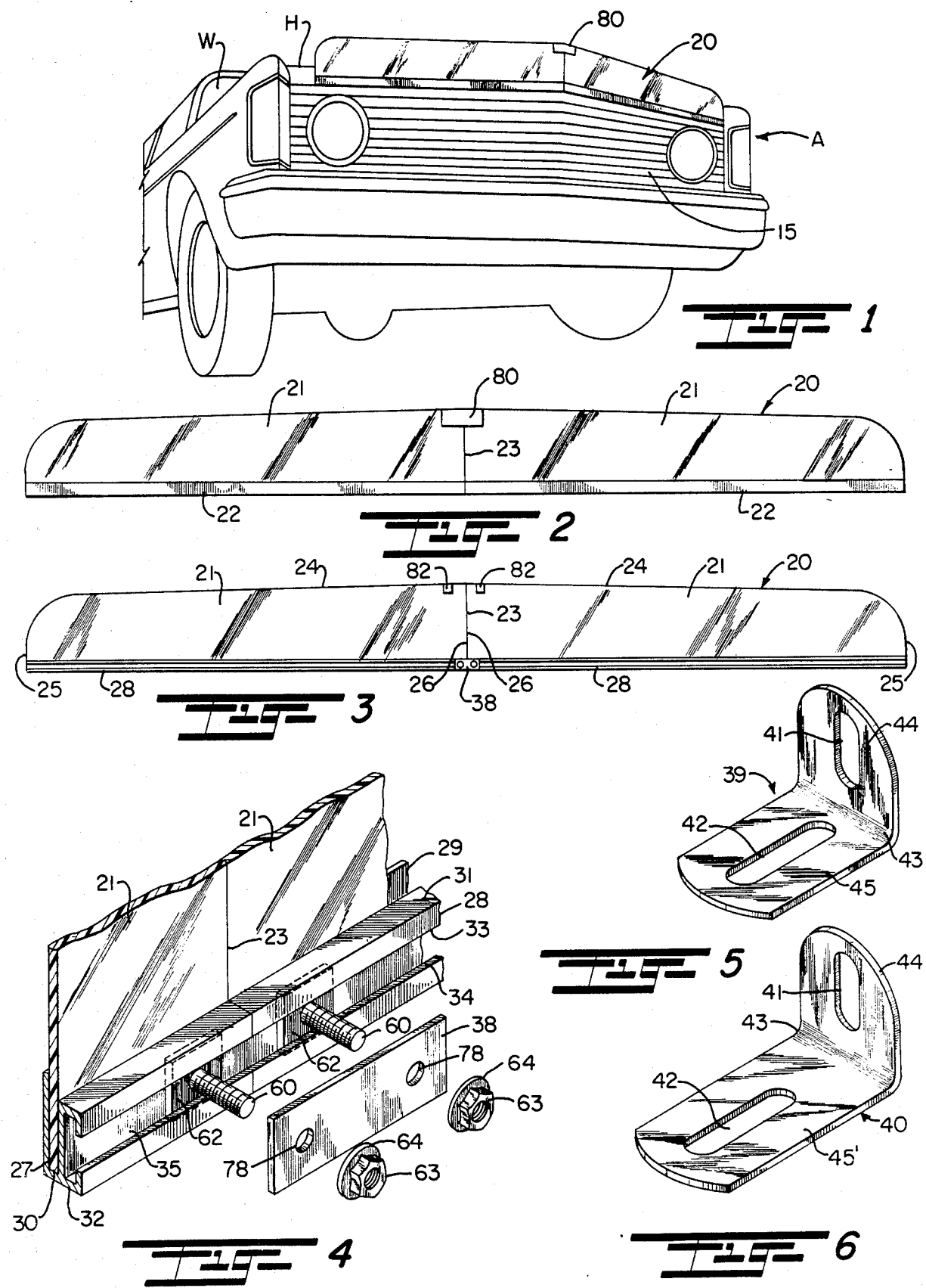

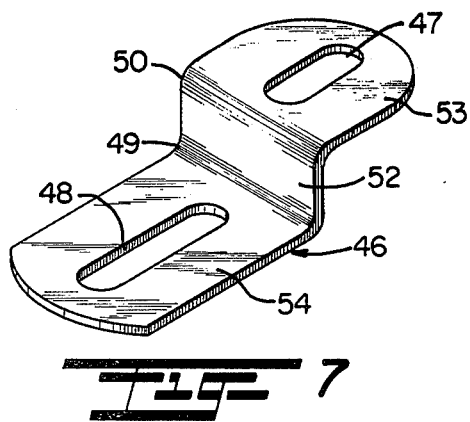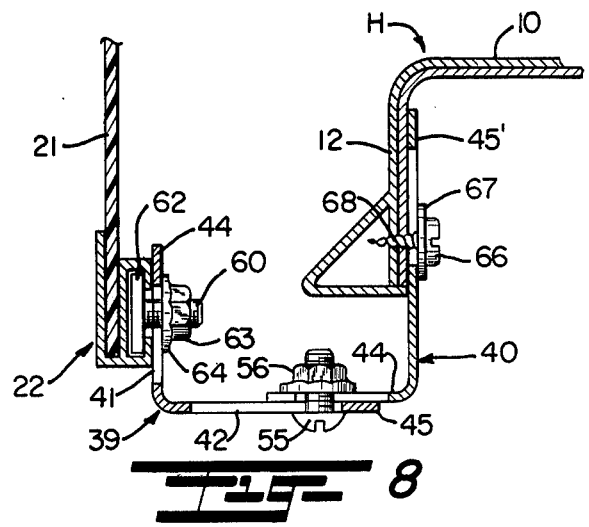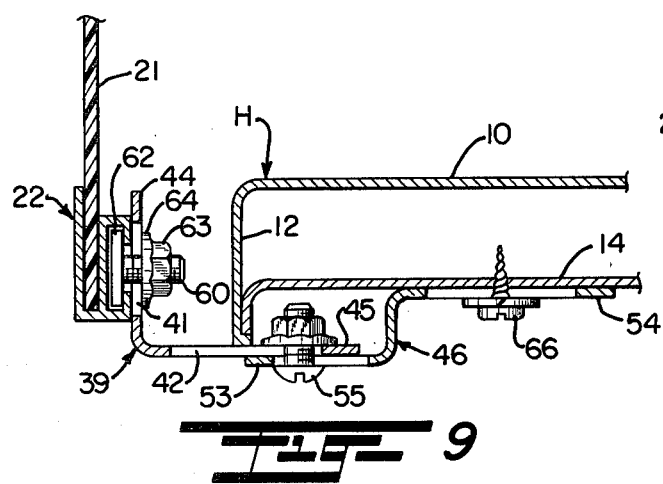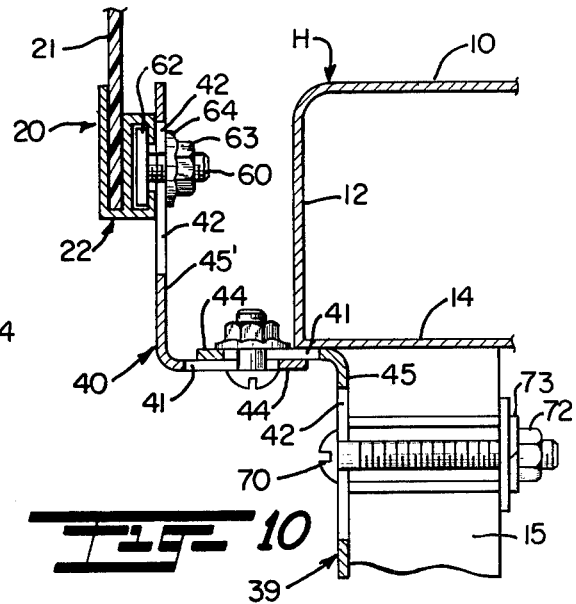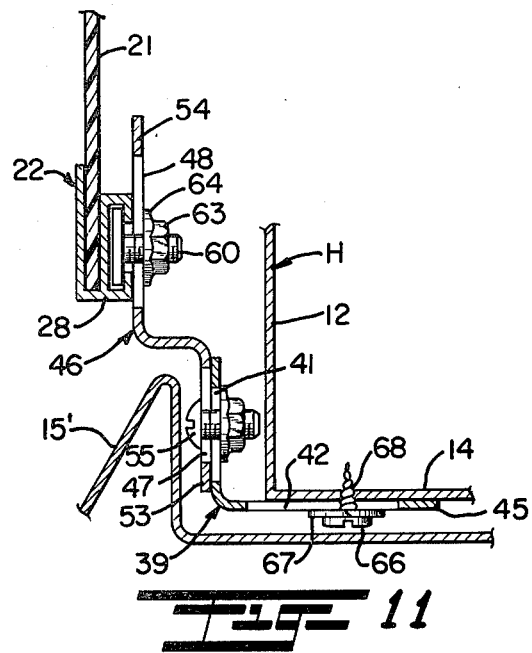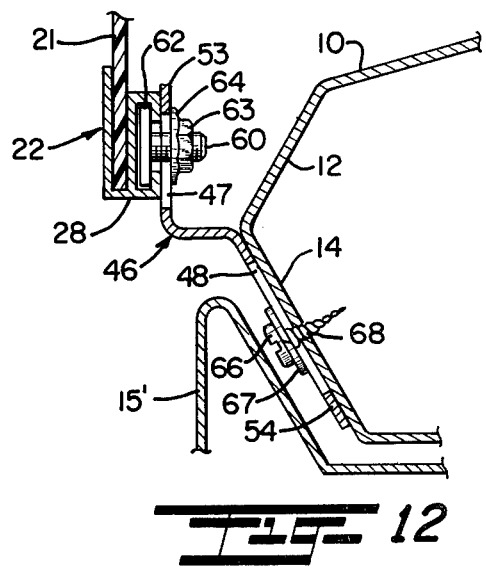

ARTICULATED DEFLECTOR SHIELD ASSEMBLY AND INTERCHANGEABLE FRAME MOUNTING SYSTEM THEREFOR

This invention relates to interchangeable automobile shield assemblies; and more particularly relates to a novel and improved shield assemby and interchangeble frame mounting system which is specifically adaptable for use in the mounting of an articulated deflector shield assembly on different makes and models of automotive vehicles.

BACKGROUND AND FIELD OF THE INVENTION

Innumerable types and varieties of deflector shields have been devised for automobiles and specifically to protect automobile windshields and hoods from the impact of insects, debris and other foreign elements. Customarily, the shield is mounted at the juncture between the hood and radiator grille. However, the great number of different sizes and designs of automobiles has compelled the use of special mounting brackets and straps which are tailored for use on each different car model or design series.

Representative of approaches which have been taken in the past are U.S. Pat. Nos. 3,836,728 and 4,178,034 to T. H. Mittendorf. For instance, the U.S. Pat. No. 3,836,728 patent discloses a two-piece bracket arrangement for securing an insect screen to the license plate holder which is supplemented by hooked elastic cords attached to the upper corners of the screen to engage the tire wells. Some adjustability is permitted by virtue of utilizing different sized brackets for different makes of automobiles coupled with the elasticity of the cords. Among the hood-mounted shields devised, U.S. Pat. No. 4,109,744 to D. T. Ping discloses the use of a shield in which its side and upper members are bolted to the frame by means of flanges which run the length of each member. The same is true of the earlier U.S. Pat. No. 1,889,440 to O. J. Groehn where the flanges which extend along the perimeter of the radiator grille are bent to clinch the radiator shell. In both cases, however, the mounting means disclosed are limited in their conformability for use in attachment to different automobiles. U.S. Pat. No. 4,153,192 to P. J. Redmond describes a hood-mounted shield with flat bracket members which permit mounting of the device to the hood. U.S. Pat. No. 4,236,592 to J. H. Ziegler, and owned by the assignee of the present invention, is directed to a hood-mounted shield arrangement which is employed in combination with an inset screen but suffers also from definite limitations insofar as its interchangeability for use where different makes and designs of automobiles is concerned.

SUMMARY OF THE INVENTION

It is therefore an object of the present invention to provide for a novel and improved interchangeable frame-mounting system which is specifically adaptable for use in the interchangeble mounting of members, such as, deflector shields to different sizes and makes of automobiles in a reliable and efficient manner.

Another object of the present invention is to provide for a novel and improved deflector shield assembly which is conformable for use in one size for interchangeable mounting on different sizes and makes of automobiles so as to protect the hood and windshield of the automobile against the impact of insects, debris and other foreign matter.

It is a further object of the present invention to provide for a novel and improved deflector shield which is compact, simply constructed with a minimum number of parts and offers minimum wind resistance while protecting the hood and windshield of the automobile from being damaged or marred by foreign matter.

It is an additional object of the present invention to provide for a novel and improved articulated deflector shield assembly having an interchangeable frame mounting system adaptable for mounting of the shield without modification to different sizes and makes of automobiles; and specifically wherein the resultant assembly and mounting achieves rigid but releasable attachment of the shield in a novel and improved manner.

In accordance with the present invention, there has been devised an articulated frame assembly for vehicles having a hood with a downwardly directed front end portion and rearwardly directed return which forms a continuation of the front end portion of the hood for releasable connection to the radiator grille of the vehicle, the frame assembly comprising a pair of complementary halves each including an elongated channel member of C-shaped configuration. Each flange or channel is provided with a rearwardly directed open slot along its substantial length, and mating edge portions at adjacent ends of the halves are adapted to abut one another with a splice releasably inserted in the open slots to interconnect the halves of the frame together. A plurality of bracket means at uniformly spaced intervals along each of the channels includes a first leg portion alignable with the slot of the channel and a second leg portion extending at an angle to the first leg portion whic conforms to the angle either of the grille, the return or front end portion of the hood together with first and second fastener means for releasably interconnecting the first and second leg portions to the channel and hood, respectively.

In a preferred embodiment of the present invention, the frame mounting system is incorporated into an articulated deflector shield assembly, the shield assembly including an elongated shield of transparent material which is inserted into the channels such that the channels extend along a lower edge of the shield in facing relation to the grille. The bracket means are defined by a plurality of interchangeable bracket members connected together between the channel and the grille, rearwardly directed return or front portion of the hood. Each bracket member is defined by a flat plate having a pair of longitudinally extending slotted portions, each plate bent to form an angle in the plate between the slotted portions. Fastener means interconnect aligned slotted portions in the brackets such that the other of the slotted portions in one of the bracket members is aligned for connection to the channel and the other of the slotted portions is aligned for connection to the radiator grille or hood.

Other objects, advantages and features of the present invention will become more readily appreciated and understood when taken together with the following detailed description in conjunction with the accompanying drawings, in which:

BRIEF DESCRIPTION OF THE DRAWINGS

FIG. 1 is a perspective view illustrating a preferred form of articulated deflector shield assembly mounted on the hood of an automobile;

FIG. 2 is a front view of the preferred form of shield assembly shown in FIG. 1;

FIG. 3 is a rear view of the preferred form of the shield shown in FIGS. 1 and 2;

FIG. 4 is an exploded view illustrating in more detail the splice between articulated shield portions of the preferred form of shield assembly;

FIGS. 5, 6 and 7 are perspective views illustrating the three bracket members employed in the interchangeable frame mounting system in accordance with the present invention;

FIG. 8 is a cross-sectional view illustrating the use of a pair of bracket members as illustrated in FIGS. 5 and 6 in mounting the preferred form of deflector shield assembly onto the hood of a vehicle;

FIG. 9 is a cross-sectional view illustrating the use of a pair of bracket members illustrated in FIGS. 6 and 7 for interchangeable mounting of a shield assembly on another style of hood;

FIG. 10 illustrates the utilization in combination with the brackets illustrated in FIGS. 5 and 6 for attachment from a shield assembly to a radiator grille;

FIG. 11 illustrates the use in combination with a pair of brackets as illustrated in FIGS. 5 and 7 for mounting of a shield assembly on another style of hood; and FIG. 12 illustrates the use of a single bracket as shown in FIG. 7 for mounting of a shield assembly on still another style of hood.

DETAILED DESCRIPTION OF THE PREFERRED EMBODIMENT

As a setting for the present invention, there is illustrated in FIG. 1 a conventional automobile A having a windshield W and a hood H. As illustrated in more detail in FIGS. 8 to 12, the hood for different automobiles can assume many different configurations which characteristically have a main, generally horizontal panel 10 curving into a downwardly directed front end 12 and a rearward return portion 14 spaced beneath the main panel and which is releasably latched to a radiator grille 15. Like portions of the hood H are correspondingly enumerated in FIGS. 8 to 12 which views are provided more as representative examples for the purpose of illustration only of various possible combinations and variations in hood design and construction.

In the preferred embodiment of the present invention, an articulated shield assembly 20 is broadly comprised of a pair of elongated transparent shield members 21, a frame mounting system which is made up of a pair of frame mounting units 22 for the shield member 21, and a common splice 23 between the units 22 and shield members 21 whereby to unite the shields 21 together in end-to-end relation to one another. As illustrated in FIGS. 1 to 4, each of the shield members 21 is constructed of a flat panel suitably composed of a plastic or clear "Plexiglas" material with a curved upper edge 24 rounded at one corner and terminating in opposite ends 25 and 26 which verge downwardly into a straight lower edge 27. When positioned in end-to-end relation to one another, the shield members 21 are dimensioned to traverse the substantial width of the hood H of any of the standard make automobiles or small trucks, foreign and domestic.

The preferred form of mounting system is defined by a pair of frame mounting units 22 which act as base supports for the shield members 21 in rigidly but releasably securing them in horizontally spaced relation to and forwardly of the hood H of an automobile. As illustrated in detail in FIGS. 2 to 7, each unit 22 is correspondingly made up of a channel member in the form of a C-shaped flange 28 and forwardly spaced wall 29 defining a vertical groove 30 therebetween for insertion of the lower edge 27 of each shield member 21. The flange 28 has rearwardly extending upper and lower sides 31 and 32 terminating in upper and lower lips 33 and 34, respectively, which are directed inwardly toward one another and spaced apart to define an open longitudinal slot 35 which extends the length of each flange 28. The flange 28 serves the dual purpose of mounting a splice plate 38 to secure a pair of shield members 21 in end-to-end relation as well as for mounting of different selected bracket members as illustrated in FIGS. 5 to 7.

Referring specifically to FIGS. 5 and 6, each discloses a right angle bracket member designated at 39 and 40 which is formed out of a flat plate having spaced, elongated slotted portions 41 and 42, respectively, each bracket member bent along a transverse line as indicated at 43 intermediately between the slotted portions 41 and 42 to form a pair of flat leg portions 44 and 45. In the case of the bracket member shown in FIG. 6, the plate out of which the bracket is formed is of greater length than that of the bracket member shown in FIG. 5 and thus its leg portion 45' is of a greater length than the leg portion 45 of FIG. 5 for a purpose to be described. Correspondingly, in FIG. 7, bracket member 46 is formed out of a flat elongated plate or metal stamping having longitudinally spaced elongated slotted portions 47 and 48 adjacent to opposite ends. In this form, the bracket member 46 is bent twice at right angles along imaginary transverse lines 49 and 50 intermediately between the slotted portions 47 and 48 so as to form an intermediate stepped portion 52 between opposite leg portions 53 and 54 with the leg portions 53 and 54 off-set in spaced parallel relation to one another. In a manner now to be described, selective utilization of one or more of the bracket members will permit interchangeable, rigid attachment of the shield assembly to the various automobile models presently on the market.

Referring for example to FIG. 8, there is illustrated utilization of a pair of bracket members 39 and 40 to the downwardly directed portion 12 of a hood 10, such as, the 1977 to 1979 Models of the Honda Civic. Specifically, the leg portion 45 of bracket member 39 is fastened to the shorter leg portion 44 of the bracket member 40 with a binding head screw 55 and flange nut 56. In turn, leg portion 44 of the bracket 39 is affixed to the flange 28 by a square head bolt defined by the threaded member 60 having a square head 62 inserted into the channel portion with the threaded member 60 projecting rearwardly through the open slot 35 in the channel and aligned slotted portions 41 in the bracket which are tightened by means of a flange nut 63. The leg portion 45' of the bracket member 40 is aligned with the inner surface of the downwardly directed portion 12 of the hood and is fastened to the hood portion 12 with a sheet metal screw 66 tightened against lock washer 67 as it is threaded into opening 68 in the downwardly directed front end portion 12.

FIG. 9 illustrates the combined use of a bracket member 39 and bracket 46 in securing shield assembly 20 to rearwardly directed return portion 14 of a hood H, such as, on the 1979 to 1982 Models of the Plymouth Champ. In this assembly, the leg portions 44 and 54 of the brackets 39 and 46, respectively, are secured to the flange 28 and return portion 14 in the same manner as described in FIG. 8. The leg portions 45 and 53 similarly are fastened together with a binding head screw 55 and flange nut 56 in the same manner as described with respect to the leg portions 44 and 45 in FIG. 8.

In FIG. 10, bracket members 39 and 40 are interconnected via their shorter leg portions 44 such that the leg portion 45 of the bracket 39 forms a downward extension from the lower end of the bracket 40 with the leg portion 45 in spaced parallel relation to the leg portions 45'. Thus, the upper leg portion 45' has its slotted portion 42 aligned for attachment to the channel-shaped flange 28 and the leg portion 45 is aligned for attachment with the front surface of grille work 15 using an elongated threaded member in the form of a bolt 70 which is secured by a hex nut 72 tightened against lock washer 73. This attachment is intended for use, for instance, on the 1975-80 Models of the Mercury Monarch.

FIG. 11 illustrates still another combination of the bracket members in which the bracket 46 has its longer leg portion 54 secured to the flange 28, and the bracket 40 has its longer leg portion 45' secured to the return portion 14 of the hood behind a portion 15' of the grille, such as, would be required for use in conjunction with the Cadillac Eldorado 1979 to 1982 Models.

FIG. 12 illustrates the ability to use a single bracket 46 for the purpose of interconnecting the shield assembly 20 to a rearwardly and downwardly angled return portion 14 on the hood of an International Harvester Scout II 1971 to 1980 Models. In this version, the shorter leg portion 53 is secured to the flange 28 while the longer leg portion 54 is bent rearwardly and attached with a sheet metal screw 66 to the return portion 14 directly behind an upwardly projecting portion 15' of the grille work.

Referring once again to FIG. 4, the frame mounting units 22 together with the shield members 21 are spliced together in end-to-end relation by a common splice plate 38 having spaced apertures 78 adapted to receive square head bolts having threaded members 60, each threaded member provided with a square head 62 which is inserted into a channel 35 in each of the frame mounting units relatively near their abutting ends. The splice plate is tightened in place so as to bear firmly against the flange 28 by employing flange nuts 63. As a preliminary to final tightening, the shield halves 21 are adjusted so as to touch each other followed by final tightening of the nuts 63. A pressure-sensitive strip 80 which may be suitably composed of a heavy paper, plastic film or sheet is adhesively attached across the upper abutting ends 26 of the shield halves, the splice strips having tabs 82 which are then bent over the back of each of the shield halves and pressed into place.

It should be noted from the foregoing that a plurality of the bracket assemblies are employed to effect the desired connection of the shield halves to the hood portion of the vehicle. Customarily, two each are assembled in association with each frame of the mounting unit uniformly spaced away from the abutting ends opposite the shield halves 21. The flexible splice tag 80 as well as the splice plate 38 have limited flexibility so as to permit bending of the shield halves away from a common plane whereby to extend somewhat in trailing relation away from the center splice 38 in conforming to the contour of the front end portion of each hood. The channel-shaped flange 28 lends to the conformability of the different bracket members in securing rigid attachment of the shield assembly in place; and the longitudinally extending or elongated slotted portions in the bracket member permit a wide degree of adjustability in length to adapt the bracket members to different hood sizes and configurations while permitting extremely close control over length adjustment between the bracket members. Thus, while the final assembly is essentially rigid, the individual bracket members are of limited flexibility or bendable to the degree necessary to permit angular adjustment where necessary to conform to the different angular dispositions between the hood attaching portion and the connecting flange on the frame mounting units 22, such as, illustrated in FIG. 12.

It is therefore to be understood that various modifications and changes may be made in the frame mounting assembly and deflector shield assembly of the present invention without departing from the spirit and scope thereof as defined by the appended claims.

I claim:

1. A frame assembly for mounting a shield member on a vehicle wherein the vehicle is characterized by having a hood with a downwardly directed front end portion on said hood for releasable connection to a radiator grille on said vehicle, said frame assembly comprising:

a pair of complementary halves, each including an upwardly opening, elongated U-shaped channel for receiving a lower edge portion of said shield member, each said channel having an elongated channel-shaped flange provided with a rearwardly directed, open slot along its substantial length and secured to the rear surface of said U-shaped channel;

means for interconnecting said complementary halves; and a plurality of angled brackets at spaced intervals along each of said flanges, each said bracket including a first leg portion and a second leg portion, each of said first and second leg portions having an elongated slot defined therein, said elongated slot in said first leg portion alignable with said slot in said channel-shaped flange, first means for releasably interconnecting said first leg portion of each said bracket to each of said pair of channel-shaped flanges, and second fastener means for releasably interconnecting said second leg portion to one of said hood and said radiator grille portion of said vehicle.

2. A frame assembly according to claim 1, each said bracket defined by a plurality of flat attaching leg portions adapted to be aligned with said elongated slot defined by said pair of channel-shaped flanges and one of said hood and radiator grille such that said frame assembly is disposed in horizontally spaced relation in front of said vehicle hood.

3. A frame assembly according to claim 1, said brackets defined by a plurality of rightangle bracket members.

4. A frame assembly according to claim 3, in which there are a pair of said right angle brackets interconnected to one another into a generally U-shaped configuration.

5. A frame assembly according to claim 3, including third fastener means extending between aligned pairs of said elongated slots in each of said brackets to adjustably interconnect said bracket members.

6. A frame assembly according to claim 1, said angled brackets including a series of three bracket members, each defined by a bendable flat plate with a pair of spaced longitudinally extending slots therein, each plate bent to form a right angle between said longitudinally extending slots in each plate.

7. A shield assembly adapted for mounting on a vehicle having a hood with a downwardly directed front end portion on said hood and a rearwardly directed return forming a continuation of said downwardly directed front end portion for releasable connection to the front grille of said vehicle, said shield assembly comprising:
   an elongated shield of transparent material, an upwardly opening elongated channel for receiving a lower edge portion of said shield, said channel provided with a rearwardly directed, elongated channel-shaped flange defining a rearwardly directed open slot along its substantial length; and
   a plurality of interchangeable angled bracket members connected together in pairs between said flange and said hood, each said bracket member defined by a flat plate having a pair of longitudinally extending slotted portions, each said plate bent to form an angle in said plate between said slotted portions, and fastener means interconnecting aligned slotted portions in each said pair of bracket members whereby the other of said slotted portions in one of said pair of bracket members is aligned for connection to said open slot defined by said channel-shaped flanges and the other of said slotted portions in the other of said pair of bracket members is aligned for connection to said hood.

8. A shield assembly according to claim 7, including a threaded member having a square head inserted in said open slot defined by said flanges with said threaded member projecting rearwardly through said open slot and an aligned slotted portion in each said one of said bracket members.

9. A shield assembly according to claim 7, said elongated shield comprised of a pair of complementary halves having mating edge portions in aligned facing relation to one another, and a splice member releasably interconnecting said complementary halves.

10. A shield assembly according to claim 9, said splice defined by a flat plate spanning said mating edge portions and provided with spaced apertures, each aperture alignable with said open slots defined by said channel-shaped flanges, and a male threaded member insertable through said slot in each flange and projecting rearwardly through one of said apertures.

11. A shield assembly according to claim 10, each said threaded member having a square head received in close-fitting engagement in each open slot of said flange.

12. A shield assembly according to claim 10, one of said bracket members having a third slotted portion in said plate, said plate bent to form an angle in said plate between adjacent ends of said slotted portions.

13. An articulated deflector shield assembly for a motor vehicle having a hood with a downwardly directed front end portion on said hood and a rearwardly directed return forming a continuation of said downwardly directed front end portion for releasable connection to the front grille of said vehicle, said shield assembly comprising:
   a pair of elongated shield members of transparent material, each including a lower edge inserted into an upwardly opening U-shaped channel member in facing relation to said grille, each said channel provided with rearwardly directed, channel-shaped flange defining an open slot along its substantial length, and splice means releasably connecting said shield members together in articulated, end-to-end relation to one another; and
   a plurality of interchangeable angled bracket members connected together in pairs between said channel and said rearwardly directed return, each said bracket member defined by a flat plate having a pair of elongated slotted portions in spaced end-to-end relation to one another, each said plate bent to form an angle in said plate between said slotted portions, and fastener means interconnecting aligned slotted portions in each said pair of bracket members whereby one of said slotted portions in one of said pair of bracket members is aligned for connection to said open slot and the other of said slotted portions in the other of said pair of bracket members is aligned for connection to said vehicle.

14. A shield assembly according to claim 13, one of said bracket members having a third slotted portion in said plate, said plate bent to form an angle in said plate between adjacent ends of said slotted portions.

15. A shield assembly according to claim 13, said splice means including a flat plate provided with spaced apertures therein, and threaded members having square heads inserted in said open slots with said threaded members projecting rearwardly through said open slots and aligned apertures in said flat plate.

16. A shield assembly according to claim 15, said splice means further including a pressure-sensitive adhesive strip interconnecting mating edges of said shield members above said channels.

* * * * *